United States Patent [19]
Compton et al.

[11] Patent Number: 5,787,313
[45] Date of Patent: Jul. 28, 1998

[54] HYBRID CAMERA INCLUDING VIEWFINDER WITH MASKS FOR PARALLAX CORRECTION AND IMAGE FORMAT INDICATION

[75] Inventors: John T. Compton, LeRoy; Robert D. Huot, Pittsford; Carl F. Leidig, Rochester, all of N.Y.

[73] Assignee: Eastman Kodak Company, Rochester, N.Y.

[21] Appl. No.: 803,487

[22] Filed: Feb. 20, 1997

[51] Int. Cl.$^6$ .............. G03B 5/00; G03B 13/14; G03B 17/48
[52] U.S. Cl. .............. 396/80; 396/84; 396/149
[58] Field of Search .............. 396/80, 84, 149, 396/296, 377, 429, 147; 348/64, 333, 341, 358; 358/296, 909.1, 906

[56] References Cited

U.S. PATENT DOCUMENTS

| | | |
|---|---|---|
| 4,432,014 | 2/1984 | Roos et al. . |
| 4,576,458 | 3/1986 | Cho et al. . |
| 4,714,962 | 12/1987 | Levine .............. 358/209 |
| 4,742,369 | 5/1988 | Ishii et al. .............. 354/441 |
| 4,949,117 | 8/1990 | Van Heynigen et al. .............. 354/412 |
| 4,978,983 | 12/1990 | Stalfors .............. 354/76 |
| 5,161,025 | 11/1992 | Nakao . |
| 5,381,205 | 1/1995 | Kotani et al. . |
| 5,398,062 | 3/1995 | Hashimoto et al. . |

FOREIGN PATENT DOCUMENTS 8-146506-A  6/1996  Japan .

*Primary Examiner*—W. B. Perkey
*Attorney, Agent, or Firm*—Charles E. Snee, III

[57] ABSTRACT

A hybrid camera includes a camera housing (12); an electronic imaging device (68) supported within the camera housing; a first optical system (58) for focusing light from a scene onto the imaging device, the first optical system having a first optical axis (16') and a first field of view (162); a film imaging plane (48) defined within the camera housing for photographic film (44); a second optical system (30) for focusing light from a scene onto the film imaging plane, the second optical system having a second optical axis (14') spaced from the first optical axis and a second field of view (164); a viewfinder (18, 26) supported by the camera housing, the viewfinder having a third optical axis (18') and a third field of view, the viewfinder being located relative to a selected one of the first and second optical systems such that the third field of view includes at least 75% of the field of view of the selected optical system; the field of view of the selected optical system being larger than that of a non-selected one of the first and second optical systems such that the field of view of the selected optical system includes at least 75% of the field of view of the non-selected optical system; an array of electronically actuateable masks (76–112; 116–150) positioned transverse to the third optical axis within the viewfinder, the masks being configured and located for actuation to correct for parallax between the viewfinder and the non-selected optical system and to indicate a print format (H, P, C) for an image to be captured on photographic film; means (20) for measuring range from the camera to an object in a scene reflecting light to be focused on the imaging device and the imaging plane and for producing a signal proportional to the range; and a controller (40), responsive to the signal, for actuating selected ones of the masks for correction for parallax, or indication of print format, or both.

12 Claims, 7 Drawing Sheets

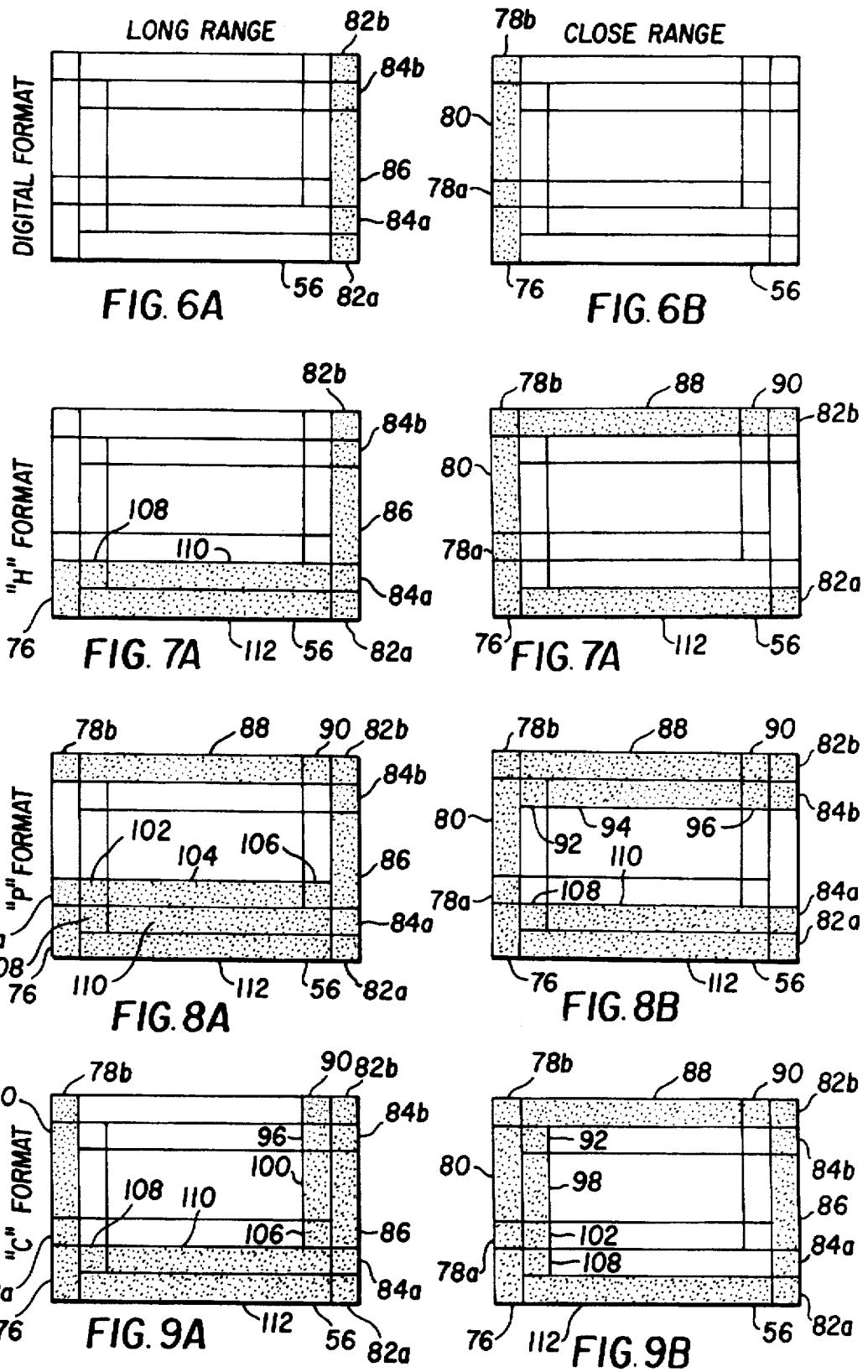

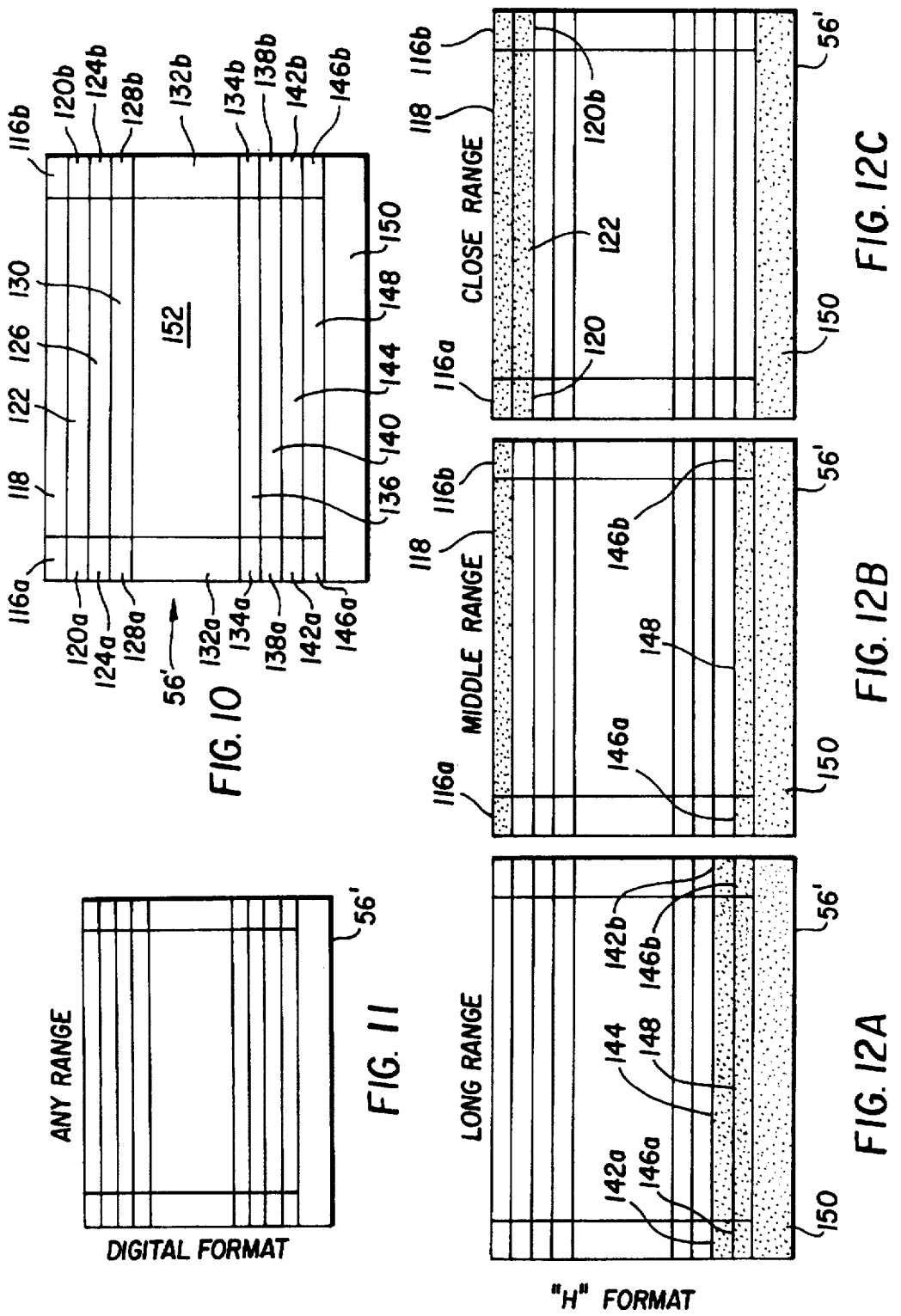

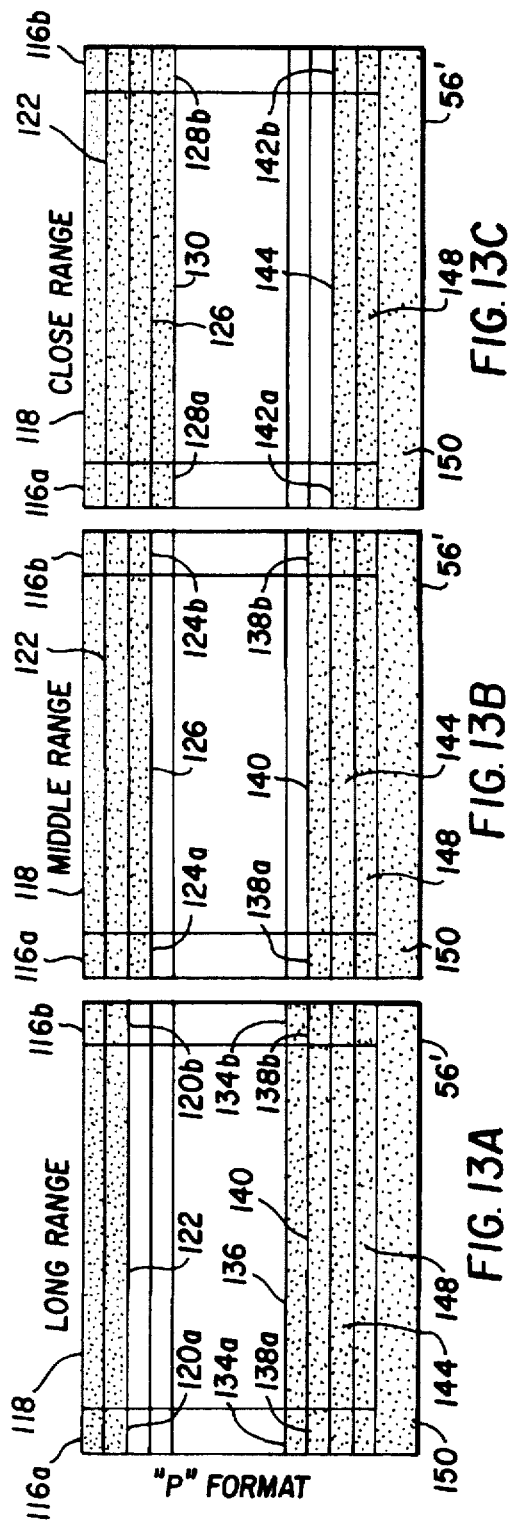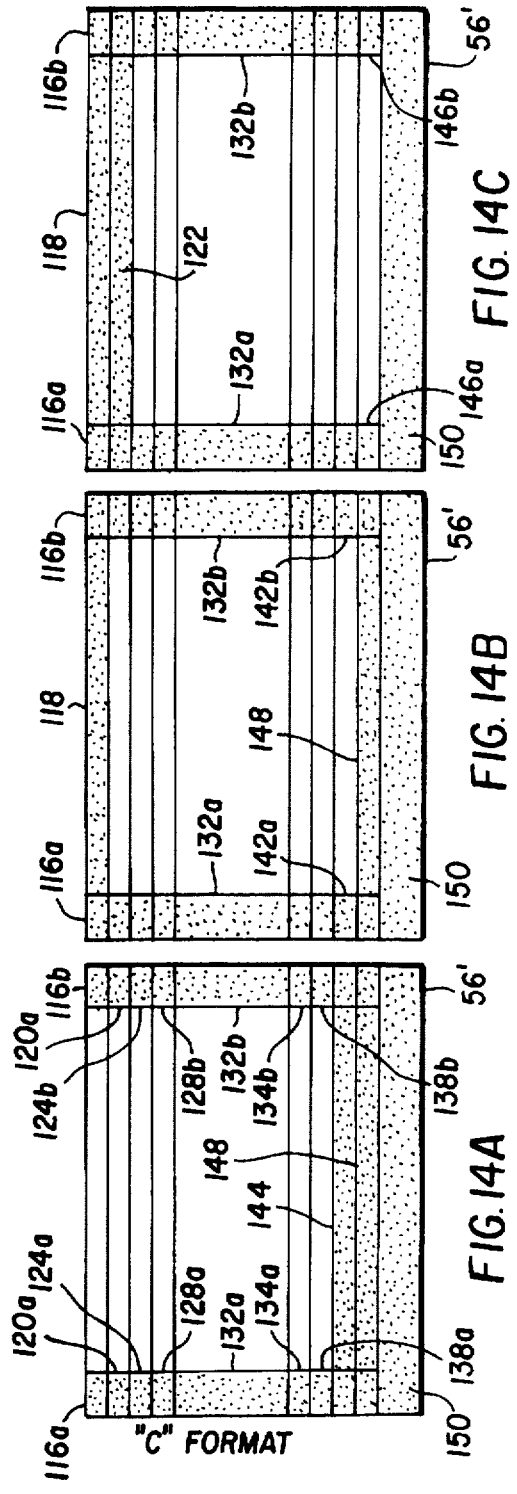

HYBRID CAMERA INCLUDING VIEWFINDER WITH MASKS FOR PARALLAX CORRECTION AND IMAGE FORMAT INDICATION

TECHNICAL FIELD

The invention concerns viewfinders for hybrid cameras which have a first, film mode in which images are captured on conventional photographic film; a second, digital or electronic mode in which images are captured by an electronic imaging device; and a third, hybrid mode in which images are captured on film and by an electronic imaging device. More particularly, the invention relates to such viewfinders which include features for masking the field of view of the viewfinder not only to correct for parallax between the viewfinder and the taking lens(es), but also to indicate a user-selected format for a print to be made from an image to be captured.

BACKGROUND OF THE INVENTION

Hybrid cameras are known in which parallel optical systems are used to direct light from a scene to a film imaging plane, an electronic imaging plane, an ocular lens of viewfinder, or some combination of these. For example, U.S. Pat. No. 4,714,962 discloses a hybrid camera which uses parallel optical systems for film and electronic capture. U.S. Pat. No. 4,742,369 discloses various hybrid cameras, some of which use a shared optical system for both film and electronic capture; and others of which use parallel optical systems. In an embodiment using parallel optical systems, the '369 patent discloses a camera-supported display for electronically captured images. The display includes a printed line to indicate, for an unspecified range to an object to be photographed, the portion of a displayed electronic image which corresponds to an image captured on film. Commonly assigned U.S. Pat. No. 4,949,117 discloses a hybrid camera of the single lens reflex type in which the film, the electronic imaging device, and the viewfinder share an objective lens system. U.S. Pat. No. 4,978,983 discloses paired film and electronic cameras with parallel optical systems in which the field of view of the electronic imaging device is shown to overlap that of the film. The output of the electronic imaging device is processed so that only that portion of the electronically captured image corresponding to the film image is downloaded to an external display, thereby correcting on the display for parallax between the parallel optical systems.

Hybrid cameras in which a common objective lens system directs light to the film, the electronic imaging device and the viewfinder are free of parallax problems. In contrast, where parallel optical systems are used in a hybrid camera, both vertical and horizontal parallax may exist between the optical system of the viewfinder and the optical systems for film capture and electronic capture. Without appropriate provision for correction of parallax, a user of such cameras may experience difficulty composing images in the viewfinder. For example, in a digital mode, the user wants to be able to tell which portion of the field of view of the viewfinder corresponds to that of the optical system for electronic capture; whereas, in the film mode, the user wants to know which portion corresponds to the field of view of the optical system for film capture. And, in the hybrid mode, the user wants to be sure that the field of view of the viewfinder is such that a desired image will be captured properly both on film and by the electronic imaging device.

Film cameras are known in which the viewfinder is provided with electronic or mechanical masks to correct for parallax between the optical system of the viewfinder and the optical system for film capture, at various ranges to an object to be photographed. In cameras such as the Advanced Photographic System (APS) cameras introduced in 1996, prior to exposure of an image the user can select one of several image formats to be used to produce prints from the image after exposure. Data corresponding to the format selected is then magnetically recorded to a magnetic layer on the back of the film for later use by a photo-finisher. In such APS cameras, the viewfinder is provided with masks to indicate a selected format to the user. Film cameras also are known in which a viewfinder includes liquid crystal display (LCD) masks, some of which can be actuated to correct for parallax at some ranges and to indicate print format at other ranges.

For hybrid cameras with parallel optical systems for film capture, electronic capture and a viewfinder, a need has existed for a simplified arrangement of the optical systems and an array of masks in the viewfinder which will provide correction for parallax and indication of print format in a film mode, a hybrid mode or a digital mode of the hybrid camera.

SUMMARY OF THE INVENTION

A primary objective of the invention is to provide an improved hybrid camera with parallel optical systems for image capture and a viewfinder, in which the viewfinder is configured to minimize parallax between itself and the optical system for electronic capture, and the field of view of the optical system for electronic capture is large enough to include the field of view of the optical system for film capture.

A further objective is to provide such a hybrid camera in which the viewfinder can be masked to correct for parallax between itself and the optical system for film capture, to indicate a selected print format for images captured on film, or both.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A hybrid camera according to the invention may include a camera body; an electronic imaging device supported within the camera body; a first optical system for focusing light from a scene onto the imaging device, the first optical system having a first optical axis and a first field of view; a film imaging plane defined within the camera body for photographic film; a second optical system for focusing light from a scene onto the film imaging plane, the second optical system having a second optical axis spaced from the first optical axis and a second field of view; and a viewfinder supported on the camera body, the viewfinder having a third optical axis and a third field of view. In accordance with the invention, the viewfinder is located relative to a selected one of the first and second optical systems such that the third field of view includes at least 75% of the field of view of the selected optical system over typical ranges to an object in a scene, which would be from about two feet (0.610 m) to infinity. Preferably, the third field of view includes 80 to 90% of the field of view of the selected optical system. This causes the viewfinder to see most of the field of view of the selected optical system. Further in accordance with the invention, the field of view of the selected optical system preferably is larger than that of a non-selected one of the first and second optical systems, such that the field of view of the selected optical system includes at least 75% of the field of view of the non-selected optical system over typical ranges. Preferably, the field of view of the selected optical system includes from 90 to 110% of the field of view of the non-selected optical system. An array of electronically actuateable masks is positioned transverse to the third optical axis within the viewfinder, the masks being configured and located for actuation to correct for parallax between the viewfinder and the non-selected optical system and to indicate a print format for an image to be captured on photographic film. Means are included for measuring range from the camera to an object in a scene reflecting light to be focused on the imaging device and the imaging plane and for producing a signal proportional to the range. A controller, responsive to the signal, is included for actuating selected ones of the masks for correction for parallax, or indication of print format, or both.

The first and second optical systems and the viewfinder may include respective movable lens units to permit zooming to different user-selected magnifications, in which case the controller determines the selected ones of the masks in response to the signal and a user-selected magnification. Preferably, the selected optical system is the first optical system for electronic imaging; the second field of view for film imaging is included within the first field of view for electronic imaging; and the imaging device comprises an area array of photosensors which produces a plurality of output signals corresponding to the first field of view. In the preferred embodiment, the camera includes an electronic display, supported by the camera body, for images captured by the imaging device; and the controller receives the plurality of output signals, selects from among the output signals those corresponding to the second field of view, and activates the display to show an image from the second field of view.

The first and second optical systems may be vertically spaced with their axes in a common vertical plane, or horizontally spaced with their axes in a common horizontal plane. Or, the first, second and third optical systems may be vertically spaced with their axes in a common vertical plane, or horizontally spaced with their axes in a common horizontal plane. The selected optical system may be the second optical system for film imaging, in which case the camera may include an electronic display, supported by the camera body, for images captured by the imaging device. The camera may include a device for selecting image capture mode and producing a further signal, in which case the controller also is responsive the further signal for actuating the selected masks.

The invention provides various advantages for cameras having parallel optical systems for the viewfinder and image capture. Because the viewfinder is configured to minimize parallax between itself and the optical system for electronic image capture, correction for parallax needs to be made essentially only between the viewfinder and the optical system for film image capture. This arrangement also reduces the required field of view for the viewfinder. The invention allows use of a simpler, less confusing set of masks in the viewfinder. The user is provided at various ranges to the subject with a field of view in the viewfinder which not only can be masked to correct for parallax, but also can be masked to indicate the print format selected by the user. This enables the user to make exposures more confidently and precisely.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIGS. 6A and 6B show how masks of the device of FIG. 5 would be actuated to correct for parallax at close and long range when only digital images are to be captured.

FIGS. 7A and 7B show how masks of the device of FIG. 5 would be actuated for a hybrid or film camera, to correct for parallax and to indicate high definition television ("H") print format at close and long range.

FIGS. 8A and 8B show how masks of the device of FIG. 5 would be actuated for a hybrid or film camera, to correct for parallax and to indicate panoramic ("P") print format at close and long range.

FIGS. 9A and 9B show how masks of the device of FIG. 5 would be actuated for a hybrid or film camera, to correct for parallax and to indicate conventional 35 millimeter ("C") print format at close and long range.

FIG. 10 shows an elevation view of a liquid crystal device including an array of electronically actuateable masks which can be used to mask for correction of parallax and indication of print format at three ranges, for a modified arrangement of viewfinder and optical systems in which essentially only vertical parallax is to be corrected.

FIG. 11 shows that no masks of the device of FIG. 10 would be actuated at any range, when only digital images are to be captured.

FIGS. 12A–C show how masks of the device of FIG. 10 would be actuated for a hybrid or film camera, to correct for parallax and to indicate H print format at long, middle and close range.

FIGS. 13A–C show how masks of the device of FIG. 10 would be actuated for a hybrid or film camera, to correct for parallax and to indicate P print format at long, middle and close range.

FIGS. 14A–C show how masks of the device of FIG. 10 would be actuated for a hybrid or film camera, to correct for parallax and to indicate C print format at long, middle and close range.

DESCRIPTION OF THE PREFERRED EMBODIMENTS

Figure 1:
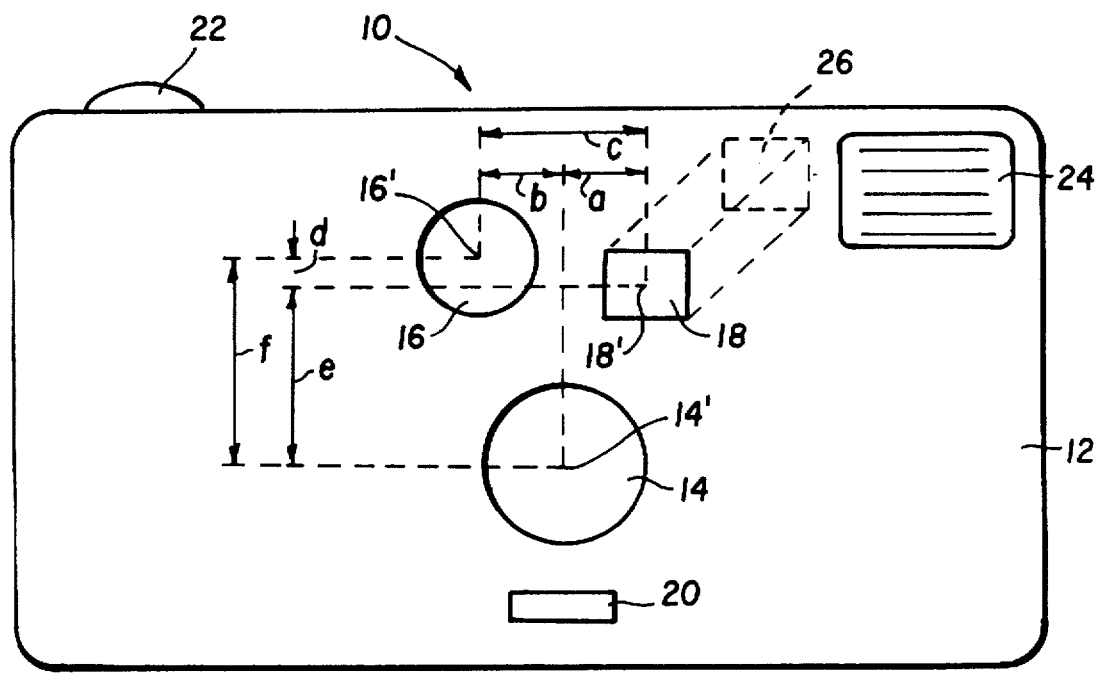
FIG. 1 shows a schematic front elevation view of a hybrid camera embodying the invention.

The following is a detailed description of the preferred embodiments of the invention, reference being made to the drawings in which the same reference numerals identify the same elements of structure in each of the several Figures.

FIG. 1 shows a schematic front elevation view of a hybrid camera 10 embodying the invention. Camera 10 includes a housing 12 which supports an objective lens 14 for focusing light onto photographic film within the camera, in the familiar manner. As used in this description, "housing" includes any internal frame or body of the camera. Lens 14 has an optical axis 14'. Above and to the left of lens 14, as viewed in FIG. 1, housing 12 supports an objective lens 16 for focusing light onto an electronic imaging device within the camera, also in the familiar manner. Lens 16 has an optical axis 16'. Above and to the right of lens 14 and below and to the right of lens 16, as viewed in FIG. 1, housing 12 supports an objective lens 18 of a viewfinder of the camera. Lens 18 has an optical axis 18'. As will be discussed subsequently in this description, the arrangement of lenses has been generalized in FIG. 1 and may vary considerably without departing from the present invention. A conventional optical emitter/receiver 20 is supported by housing 12 for measuring range to an object in a scene to be photographed. Such an emitter is disclosed as part of an auto-focus system in U.S. Pat. No. 4,827,302. An image capture button 22 enables the user to initiate an image capture sequence. In the familiar manner, button 22 may be connected to a two-stage switch which signals in a first position that the user is ready to make an exposure and signals in a second position that an exposure sequence should commence. Such a switch is disclosed in U.S. Pat. No. 5,543,889. A flash unit 24 may be included.

Figure 2:
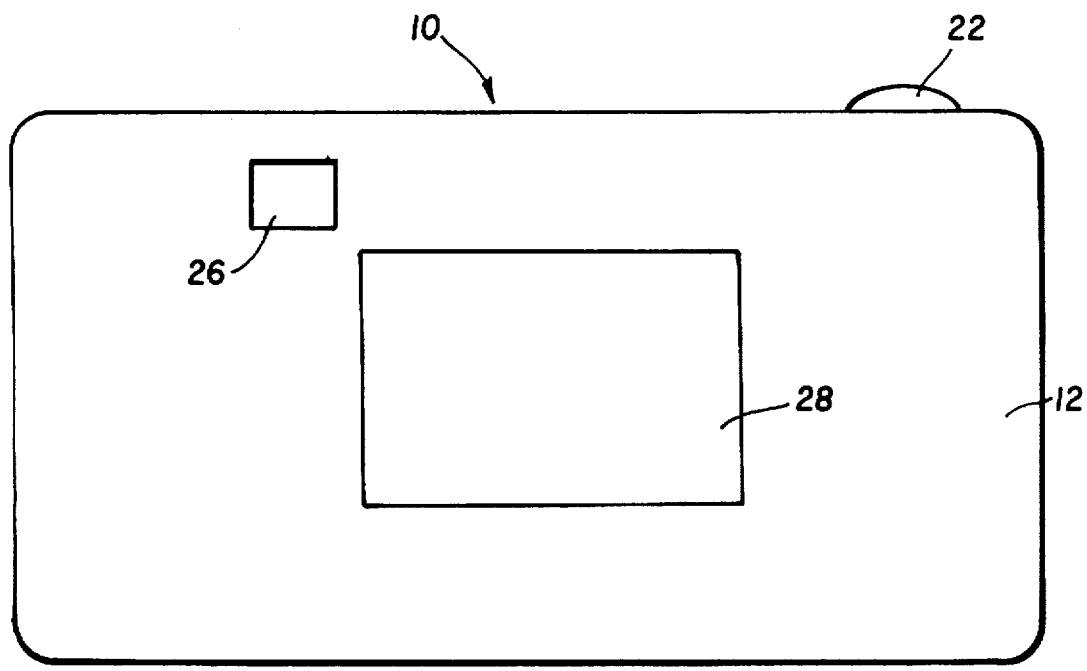
FIG. 2 shows a schematic rear elevation view of the camera of FIG. 1.

As shown in FIG. 2, a rear lens 26 is provided for the viewfinder of the camera. Lenses 18 and 26 are shown schematically to be offset from one another, by conventional means such as prisms not illustrated, to locate lens 18 more closely to lenses 14 and 16 and thereby minimize horizontal and vertical parallax. The arrangement of lenses 14, 16, 18 has been generalized in FIG. 1. So, the axes of lenses 14 and 18 are displaced horizontally by a distance a; the axes of lenses 14 and 16 are displaced horizontally by a distance b; and the axes of lenses 16 and 18 are displaced horizontally by a distance c. Similarly, the axes of lenses 16 and 18 are displaced vertically by a distance d; the axes of lenses 14 and 18 are displaced vertically by a distance e; and the axes of lenses 14 and 16 are displaced vertically by a distance f. Thus, if no provision were made for correction for Parallax, the field of view seen by a user via lenses 18, 26 necessarily will be different, due to parallax, from the field of view of either lens 14 or lens 16. When a scene or object to be photographed is located at a great distance from the camera, the fields of view of the three lenses preferably should be virtually indistinguishable. However, as the object moves closer to the camera, parallax becomes progressively more and more pronounced. As a result, though the fields of view may overlap, the fields of view of lenses 14 and 16 will be shifted vertically and horizontally relative to each other and relative to the field of view of lens 18. The degree of the shift, as is understood by those skilled in the art, is a function of the characteristics of the optical systems, their relative displacements, and the range to the object in the scene.

In accordance with a broad concept of the invention, lens 18 of the viewfinder should be located sufficiently close to a selected one of lenses 14 and 16; so that, the unmasked field of view of lens 18, at typical ranges to an object to be photographed, will include at least 75%, preferably 80 to 90% of the field of view of the selected one of lenses 14 and 16, at typical ranges to an object in a scene. With this arrangement, a user of the camera always will be able to see through the unmasked viewfinder most or all of the field of view of the selected one of lenses 14 and 16; and essentially no correction for parallax will be needed between lens 18 and the selected lens. Thus, appropriate masks can be provided in the viewfinder to correct for parallax between lens 18 and the non-selected one of lenses 14 and 16, to indicate print format, or both. Also in accordance with the broad concept, the field of view of the selected one of lenses 14 and 16 should be chosen to be larger than that of the non-selected lens; so that, the field of view of the selected lens, at typical ranges to an object to be photographed, will include at least 75%, preferably 90 to 110%, of the field of view of the non-selected lens. Thus, a user of the camera always will be able to see through the viewfinder most or all of the field of view of both lenses 14 and 16.

In accordance with a preferred embodiment of the invention, lens 18 should be located sufficiently close to lens 16 so that essentially no correction for parallax will be needed between lenses 16 and 18, as described in the preceding paragraph. Also, the unmasked field of view of viewfinder lens 18 preferably is selected to be somewhat smaller than that of lens 16 at typical ranges. In this case, the field of view of lens 16 for electronic capture preferably is selected to include the field of view of lens 14 for film capture, at typical ranges. Thus, an electronically captured image should always include the entirety of an image captured on film, though from a slightly different perspective. In use, however, the viewfinder would be masked; so that, its field of view will be somewhat smaller than that of lens 14 when the camera operating in a film or hybrid mode and somewhat smaller than that of lens 16 when the camera is operating in a digital mode. Thus, if the user is satisfied with the view through the masked viewfinder, he or she can be confident that the same view, and more, actually will be exposed onto the film and captured electronically.

An image display panel 28, such as a conventional liquid crystal display (LCD), may be included to enable a user to preview or review an electronically captured image. Preferably, the field of view displayed on panel 28 is somewhat smaller than that actually captured electronically. Thus, if the user is satisfied with the image presented on panel 28, he or she can be confident that the same view, and more, actually was captured electronically and on film, when the camera is operating in a hybrid mode. See also the subsequent discussion regarding correction at display 28 for parallax between lenses 14 and 16.

Figure 3A:
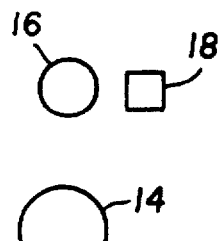
FIGS. 3A to 3G show various alternative arrangements of taking and viewfinder lenses of the camera.
Figure 3B:
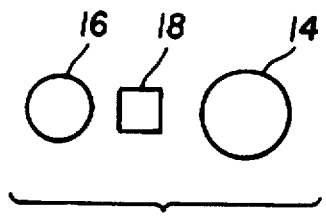
Figure 3C:
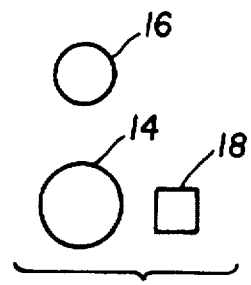
Figure 3D:
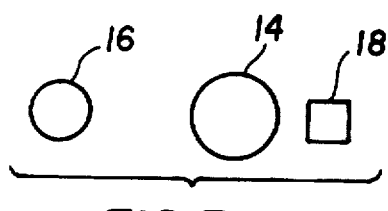
Figure 3E:
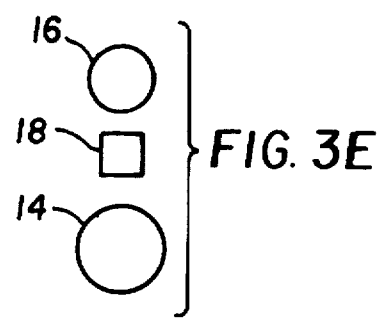
Figure 3F:
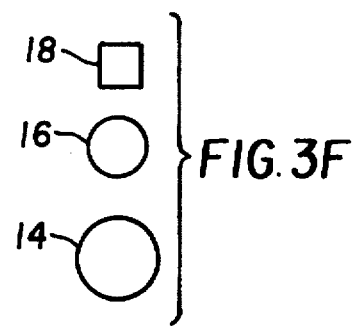
Figure 3G:
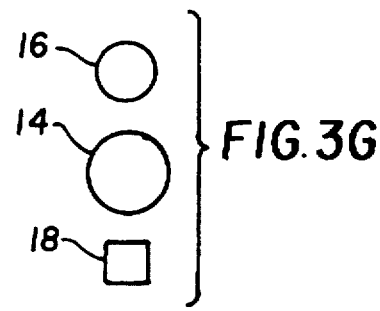

FIGS. 3A to 3G show illustrative alternative arrangements of lenses 14, 16 and 18 which can be used in accordance with the invention. In FIG. 3A, lenses 14 and 16 are vertically spaced with their axes in a common vertical plane, lens 18 being positioned to minimize parallax between itself and lens 16. In FIG. 3B, lenses 14 and 16 are horizontally spaced with their axes in a common horizontal plane, lens 18 being positioned to minimize parallax between itself and lens 16. In FIG. 3C, lenses 14 and 16 again are vertically spaced with their axes in a common vertical plane, but lens 18 is positioned to minimize parallax between itself and lens 14. In FIG. 3D, lenses 14 and 16 again are horizontally spaced with their axes in a common horizontal plane, but lens 18 is positioned to minimize parallax between itself and lens 14. In FIGS. 3E to 3G, lenses 14, 16 and 18 are vertically spaced with their axes in a common vertical plane. In FIG. 3E, lens 18 is between lenses 14 and 16; in FIG. 3F, above lens 16; and in FIG. 3G, below lens 14. Other arrangements may occur to those skilled in the art in which the optical systems and their fields of view are configured in accordance with the invention.

Figure 4:
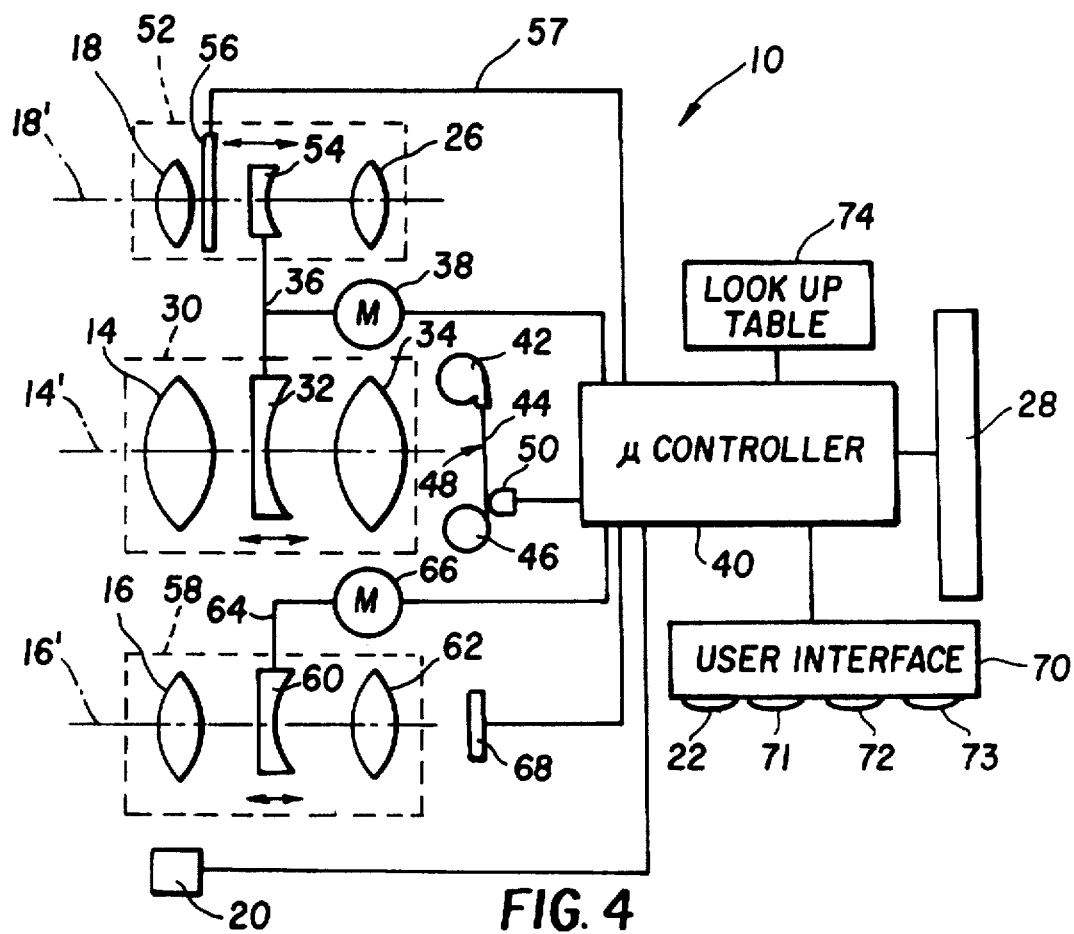
FIG. 4 shows a schematic diagram of internal components of the camera of FIG. 1, indicating the separate optical axes of the viewfinder, the optical system for the film, and the optical system for the electronic imaging device.

FIG. 4 shows schematically various internal features of camera 10. A zoom optical system 30 includes lens 14; however, the invention also may be used in cameras not having a zoom capability. In the illustrated embodiment, optical system 30 includes a conventional movable lens unit 32 and a fixed rear lens unit 34. A conventional zoom mechanism 36, shown schematically, is connected for operation by a zoom motor 38 which is governed by a programmable microcontroller 40. A conventional shutter and aperture mechanism also would be included, not illustrated. As will be understood by those skilled in the art, a cartridge 42 dispenses a strip of photographic film 44 which is wound onto a take-up spool 46. The photographic emulsion side of film 44 is located at a film imaging plane 48 on which light is focused by optical system 30 in a well-known manner. A magnetic read/record head 50 is connected to microcontroller 40 and engaged with a magnetic layer on the back of film 44; so that, magnetic information may be read from or recorded onto film 44. Commonly assigned U.S. Pat. Nos. 5,021,820 and 5,130,745 disclose examples of how such a head 50 can be used.

A zoom viewfinder optical system 52 includes lens 18, a conventional movable lens unit 54 connected for operation by mechanism 36, and a fixed rear lens unit 56. An LCD mask array 56 is supported by housing 12 within optical system 52, transverse to optical axis 18' and between lens 18 and lens unit 54. A suitable electrical control connector 57 extends from array 56 to microcontroller 40 which governs operation of the array, as will be described. A zoom optical system 58 includes lens 16, a conventional movable lens unit 60, and a fixed rear lens unit 62. A conventional zoom mechanism 64, shown schematically, is connected for operation by a zoom motor 66 which is governed by microcontroller 40. A conventional electronic imaging device 68, such as an area array of charge-coupled devices, is positioned in a conventional manner to receive light focused by optical system 58. Depending on the particular type of electronic imaging device, optical system 58 also may include a conventional shutter and aperture mechanism, not illustrated.

A user interface 70, which includes image capture button 22, is connected to microcontroller 40. Interface 70 also may include various other user-actuated controls, such as a zoom control button 71, an image capture mode selection button 72, and a print format selection button 73. Button 72 would be used to set the image capture mode of camera 10 for capture only on film for conventional photography, capture only by imaging device 68 for digital photography, or hybrid capture on film and by imaging device for both types of photography. Button 73 would be used to select a format for an eventual photographic print to be made from film 44. The print formats could include those used on the recently introduced APS cameras such as, for example, high definition television format ("H" format), panoramic format ("P" format), or conventional 35 mm format ("C" format). Buttons 71–73 also would be accessible from the exterior of the camera. For simplicity, buttons 71–73 are not illustrated in FIGS. 1 and 2.

In operation of the camera, a user would press button 71 to achieve a desired degree of magnification of a scene, button 72 to select an image capture mode, and button 73 to select a desired print format. Then the user would press button 22 to its first position, thereby signaling microcontroller 40 to activate emitter/receiver 22 and its conventional processing circuitry to determine a range to an object in the scene to be photographed. The camera also could include a conventional automatic focus system, not illustrated. A look-up table 74 is provided for use by controller 40 to operate mask array 56. For a given combination of film imaging area at imaging plane 48 and electronic imaging area at imaging device 68, the table would be preprogrammed using conventional techniques familiar to those skilled in the art, to correlate various configurations of actuated segments of array 56 which will correct for parallax and indicate selected format, with various combinations of ranges to an object, magnifications of optical systems 30, 52, 58, and user-selected print format. Using signals from emitter/receiver 22, buttons 72 and 73, and the zoom optical systems, microcontroller 40 then would refer to table 74 to determine which mask segments to actuate in mask array 56. Once the mask segments have been actuated, the user would see a field of view in the viewfinder which has been masked to correct for parallax between lens 18 and lens 14 for conventional and hybrid photography, and between lens 18 and lens 16 for digital photography. The field of view of the viewfinder also would be masked to indicate the selected print format. After composing the image in the masked viewfinder, the user would press button 22 to its second position to capture the selected image(s). Later, magnetic head 50 would be used to record a code onto the film to indicate the selected print format.

Figure 5:
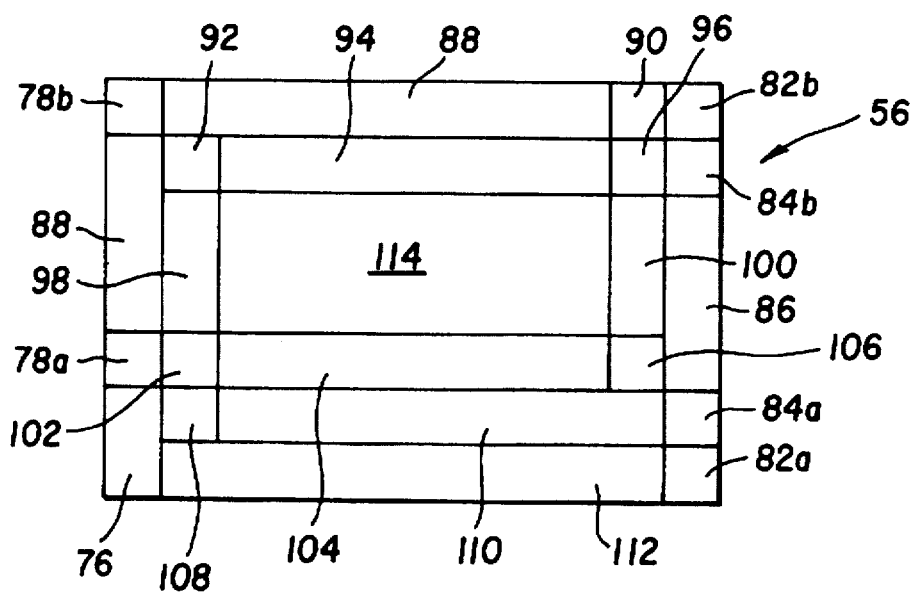
FIG. 5 shows an elevation view of a liquid crystal device including an array of electronically actuateable masks which can be used to mask for correction of parallax and indication of print format at two ranges, for an arrangement of viewfinder and optical systems as shown in FIG. 1.

FIG. 5 illustrates schematically one embodiment of mask array 56, as viewed from the front of the camera. The array is composed of a matrix of liquid crystal display (LCD) elements which can be actuated using techniques familiar to those skilled in the art. A plurality of individual rectangular masks or mask segments 76 to 112 are defined, surrounding an open, unmasked center segment 114. The overall area of array 56 corresponds to the overall field of view of the viewfinder. Pairs of masks labeled with the same numeral plus "a" or "b" would be actuated simultaneously, as will be described.

The array is divided into a plurality of horizontal and vertical bands composed of segments of different sizes. At the left side of the array, segments 76, 78a, 78b and 80 define a first vertical band. At the right side, segments 82a, 82b, 84a, 84b and 86 define a second vertical band. Between these vertical bands, segments 88 and 90 define a first upper horizontal band; segments 92, 94 and 96 define a second upper horizontal band just above center segment 114; and segments 98, 100 define vertical bands at opposite ends of center segment 114. Below the center segment and still between the first and second vertical bands, segments 102, 104, 106 define a first lower horizontal band; segments 108 and 110, a second lower horizontal band; and segment 112, a third horizontal band. Those skilled in the art will appreciate that different sized segments and more or fewer bands may be used depending on the precision of correction that is desired.

For the embodiment of array 56 shown in FIG. 5, the optical axes are assumed to be offset as shown in FIG. 1. Optical axis 18' is assumed to be tilted to intersect with axis 14' at a point between anticipated long and close ranges to an object to be photographed. Axes 14' and 16' are assumed to be essentially parallel. For objects at great distances from the camera, essentially at infinity, the fields of view of lenses 14 and 16 are assumed to be aligned essentially along their top and left edges, as viewed from the front of the camera. At great distances from the camera, the field of view of lens 16 is assumed to extend below that of lens 14. The field of view of lens 18 is chosen to include enough of the fields of view of lenses 14 and 16; so that 75 to 95% of the field of view of lenses 14 and 16 will be seen at lens 18 at any range chosen. Preferentially choosing the viewfinder to have essentially no parallax with lens 16 minimizes the field of view of the viewfinder. As objects move closer to the camera, the field of view of lens 14 will shift downward and to the right across the field of view of the viewfinder, as seen from the back of the camera, due to vertical and horizontal parallax. At the same time, the field of view of lens 16 will shift to the right across the field of view of the viewfinder due to horizontal parallax. Vertical parallax between lenses 16 and 18 may be assumed to be negligible in the arrangement of FIG. 1. So, without masking for parallax correction and image indication in the viewfinder, the user could have difficulty composing an image prior to exposure since the separate fields of view of lenses 14 and 16 could not be readily distinguished within the field of view of lens 18.

Segments 76 to 112 are configured and located in array 56 to permit their actuation in combinations which will correct for parallax and indicate a selected print format at a long range and a close range. If button 72 is pressed for capture only by imaging device 68 for digital images, mask segments 82a, 82b, 84a, 84b and 86 would be actuated as shown in FIG. 6A for objects at long range from the camera, thus masking the right side of the field of view of lens 18, as seen from the front of the camera. This would correct adequately for horizontal parallax between lenses 16 and 18. At close range as shown in FIG. 6B, mask segments 76, 78a, 78b and 80 would be actuated, thus masking the left side of the field of view of lens 18. Thus, in the digital mode of the camera, correction primarily for horizontal parallax is achieved at long and close range between lenses 16 and 18, which is acceptable for many applications. If continuous adjustment for parallax is desired, a larger number of smaller mask segments could be used without departing from our invention.

If button 72 is pressed for capture only on film or for hybrid capture, the mask segments of FIGS. 7A to 9B would be actuated, depending on print format and range, to correct for horizontal and vertical parallax between lenses 14 and 18. For the H format of FIG. 7A with the object at long range, segments 82b, 84b, and 86 would be actuated to correct for horizontal parallax. For the H format of FIGS. 7A, B and also for the P and C formats of FIGS. 8A, B and 9A, B, the lower half of segment 76 plus segments 82a and 112 would be actuated to indicate change in format from a digital aspect ratio, for example, of about 16:12 to a film/hybrid aspect ratio, for example, of about 16:9. The upper half of segment 76, plus segments 108, 110 and 84a would be actuated to correct for vertical parallax. In FIG. 7B with the object at close range, the lower half of segment 76 plus segments 82a and 112 again would be actuated to indicate change in format from digital to film/hybrid. The upper half of segment 76, plus segments 78a and 80 would be actuated to correct for horizontal parallax. Finally, segments 78b, 82b, 88, and 90 would be actuated to correct for vertical parallax. Thus, segment 76 serves for both parallax correction and format indication at long and short range; and segment 82b serves for horizontal parallax correction at long range and vertical parallax correction at short range.

For the P format of FIG. 8A with the object at long range, the upper half of segment 76, plus segments 84a, 108 and 110 would be actuated to correct for vertical parallax. A lower portion of segment 86, plus segments 78a, 102, 104, and 106 would be actuated to indicate P format. The remainder of segment 86 and segment 84b would be actuated to correct for horizontal parallax. Segments 78b, 82b, 88 and 90 would be actuated to indicate P format. In FIG. 8B with the object at close range, the upper half of segment 76, plus segments 84a, 108, and 110 would be actuated to indicate P format. Segments 78a and the lower portion of segment 80 would be actuated to correct for horizontal parallax. Segments 78b, 82b, 88 and 90 would be actuated to correct for parallax. The upper portion of segment 80, plus segments 84b, 92, 94 and 96, would be actuated to indicate P format. Thus, segments 84a, 84b, 108, and 110 serve for parallax correction at long range and format indication at short range; and segments 78a, 78b, 82b, 88, and 90 serve for format indication at long range and parallax correction at short range.

For the C format of FIG. 9A with the object at long range, the upper half of segment 76, plus segments 84a, 108 and 110 would be actuated to correct for vertical parallax. Segments 82b, 84b, and 86 would be actuated to correct for horizontal parallax. Segments 78a, 78b, 80, 90, 96, 100, and 106 would be actuated to indicate C format. In FIG. 9B with the object at close range, segments 84a, 84b, and 86 would be actuated to indicate C format. The top half of segment 76, plus segments 78a and 80, would be actuated to correct for horizontal parallax. Segments 92, 98, 102, 108 would be actuated to indicate C format. Segments 78b, 82b, 88 and 90 would be actuated to correct for vertical parallax. Thus, segments 82b, 84a, 84b, 86, and 108 serve for parallax correction at long range and format indication at short range; and segments 78b, 80, and 90 serve for format indication at long range and parallax correction at short range.

The embodiment of mask array 56 shown in FIG. 5 is based on an assumption of significant horizontal parallax between lens 18 and lenses 14 and 16. However, if the horizontal displacements a and b are made as small as practical, horizontal parallax becomes essentially negligible. Vertical parallax between lenses 16 and 18 may be assumed to be essentially negligible. To correct for vertical parallax between lenses 18 and 14 in such an instance, an alternative mask array 56' may be used, as shown in FIG. 10. Array 56' may include a plurality of individual rectangular masks or mask segments 116 to 150, surrounding an open, unmasked center segment 152. Pairs of masks labeled with the same numeral plus "a" or "b" would be actuated simultaneously, as will be described. The array is divided into a plurality of horizontal and vertical bands composed of segments of different sizes. At the top of the array, segments 116a, 116b and 118 define a first upper horizontal band; segments 120a, 120b, and 122 define a second upper horizontal band; segments 124a, 124b, and 126 define a third upper horizontal band; and segments 128a, 128b and 130 define a fourth upper horizontal band. Segments 132a, 132b define first and second vertical bands on the left and right sides of center segment 152. Below center segment 152, segments 134a, 134b and 136 define a first lower horizontal band; segments 138a, 138b, and 140 define a second lower horizontal band; segments 142a, 142b, and 144 define a third lower horizontal band; segments 146a, 146b, and 148 define a fourth lower horizontal band; and segment 150 defines a fifth lower horizontal band. Those skilled in the art will appreciate that different sized segments and more or fewer bands may be used depending on the precision of correction that is desired.

Segments 116 to 150 are configured and located in array 56' to permit their actuation in combinations which will correct for vertical parallax and indicate a selected print format at a long range, a middle range, and a close range. If button 72 is pressed for capture only by imaging device 68 for digital images, FIG. 11 shows that no masks would be actuated at any range, since the vertical and horizontal displacements between lenses 16 and 18 is essentially negligible.

If button 72 is pressed for capture only on film or for hybrid capture, the mask segments of FIGS. 12A to 14C would be actuated, depending on print format and range, to correct for vertical parallax between lenses 14 and 18. For the H format of FIG. 12A with the object at long range, segments 142a, 142b, 144, 146a, 146b, and 148 would be actuated to correct for parallax. In FIGS. 12A to 14C, segment 150 would be actuated to indicate change in format from digital to film/hybrid. In FIG. 12B with the object at middle range, segments 116a, 116b, 118, 146a, 146b, and 148 would be actuated to correct for parallax. In FIG. 12C with the object at close range, segments 116a, 116b, 118, 120a, 120b, and 122 would be actuated to correct for parallax.

For the P format of FIG. 13A with the object at long range, segments 116a, 116b, 118, 120a, 120b, 122, 134a, 134b, 136, 138a, 138b, and 140 would be actuated to indicate P format. Segments 142a, 142b, 144, 146a, 146b, and 148 would be actuated to correct for parallax. In FIG. 13B with the object at middle range, segments 116a, 116b, 118, 146a, 146b, and 148 would be actuated to correct for parallax. Segments 120a, 120b, 122, 124a, 124b, 126, 138a, 138b, 140, 142a, 142b, and 144 would be actuated to indicate P format. In FIG. 13C with the object at close range, segments 116a, 116b, 118, 120a, 120b, and 122 would be actuated to correct for parallax. Segments 124a, 124b, 126, 128a, 128b, 130, 142a, 142b, 144, 146a, 146b, and 148 would be actuated to indicate P format. Segments 116a, 116b, 118 serve for format indication at long range and for parallax correction at middle and close range. Segments 120a, 120b, 122 serve for format indication at long and middle range and for parallax correction at close range. Segments 142a, 142b, 144 serve for parallax correction at long range and for format indication at middle and close range. Segments 146a, 146b, 148 serve for parallax correction at long and middle range and for format indication at close range.

For the C format of FIG. 14A with the object at long range, segments 116a, 116b, 120a, 120b, 124a, 124b, 128a, 128b, 132a, 132b, 134a, 134b, 138a, and 138b would be actuated to indicate C format. Segments 142a, 142b, 144, 146a, 146b, and 148 would be actuated to correct for parallax. In FIG. 14B with the object at middle range, segments 116a, 116b, 118, 146a, 146b, and 148 would be actuated to correct for parallax. Segments 120a, 120b, 124a, 124b, 128a, 128b, 132a, 132b, 134a, 134b, 138a, 138b, 142a, and 142b would be actuated to indicate C format. In FIG. 14C with the object at close range, segments 116a, 116b, 118, 120a, 120b, and 122 would be actuated to correct for parallax. Segments 124a, 124b, 128a, 128b, 132a, 132b, 134a, 134b, 138a, 138b, 142a, 142b, 146a, and 146b would be actuated to indicate C format. Segments 116a, 116b serve for format indication at long range and for parallax correction at middle and short range. Segments 120a, 120b serve for format indication at long and middle range and for parallax correction at close range. Segments 142a, 142b serve for parallax correction at long range and for format indication at middle and close range. Segments 146a, 146b serve for parallax correction at long and middle range and for format indication at close range.

Figure 15:
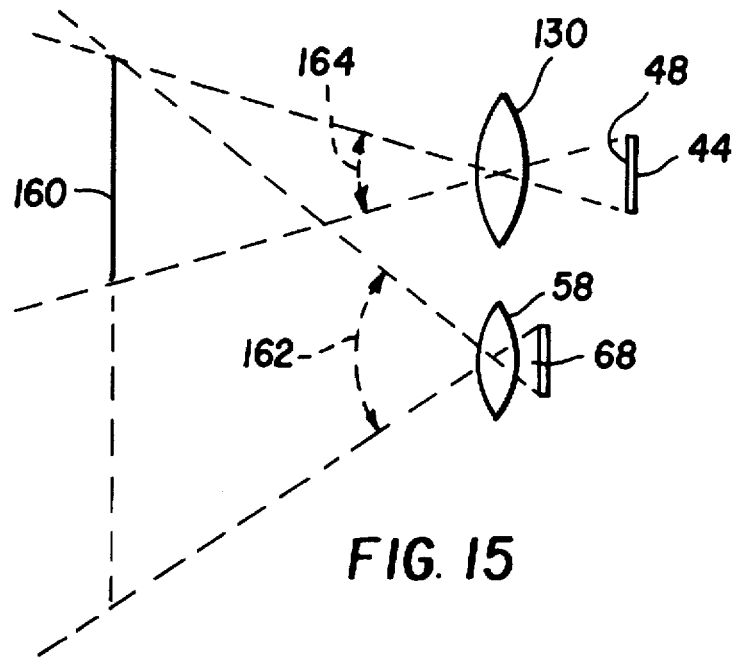
FIG. 15 shows schematically how the fields of view overlap for the optical system of the imaging device and the optical system of the film at one range.

FIG. 15 shows schematically how at any given range to an object to be photographed, the fields of view of optical systems 30 and 58 preferably are overlapped. Although optical system 58 is shown below optical system 30 in the schematic illustration of FIG. 15, those skilled in the art will appreciate that the principles now to be discussed apply in any orientation, including that of FIG. 1. As indicated in the figure, when an object 160 in a scene is focused on film imaging plane 48, that object also is completely within a field of view 162 of optical system 58, which will focus the same object (and more) onto imaging device 68. In other words, a field of view 164 of optical system 30 is included within field of view 162 of optical system 58. If the entire scene viewed by imaging device 68 were presented on display 28 during film or hybrid photography, the user could have difficulty determining the portion of the displayed scene which corresponds to the scene focused on film imaging plane 48. The unmasked field of view of viewfinder optical system 52, not shown in FIG. 15, preferably would include field of view 162 at typical ranges.

Figure 16:
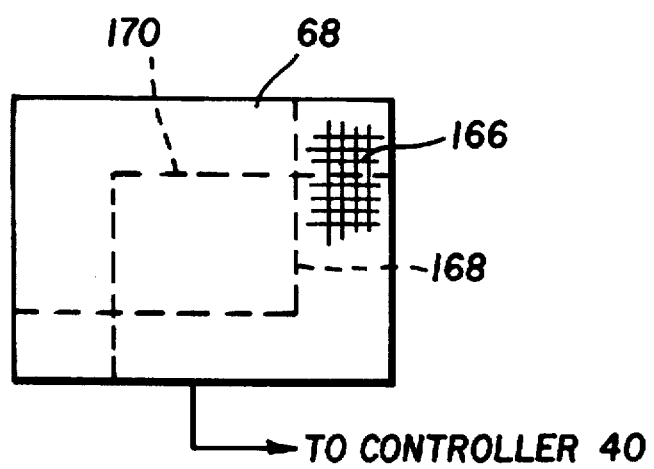
FIG. 16 shows a schematic plan view of an electronic imaging device of a type useful in the invention, indicating how, at all ranges, a field of view of the imaging device includes a field of view of the film.

FIG. 16 shows schematically that imaging device 68 comprises an area array of photosensors 166 which collectively define an imaging plane for the imaging device. At long range, the scene focused on the film imaging plane 48 corresponding to field of view 164 also would be imaged to a portion 170 of the array surrounded by dashed lines. As the range decreases for the arrangement of lenses of FIG. 1, parallax would cause the scene focused on the film imaging plane to move upward and laterally on the array, eventually reaching a location 168 surrounded by dash-dot lines. Of course, if essentially only vertical parallax exists between systems 30 and 58, field of view 164 and portion 168 may be extended horizontally completely across field of view 162, to use as many of photosensors 166 as possible. For a given geometric arrangement of lenses, film imaging planes, imaging devices and optical systems, the location of portion 168 within field of view 162 can be calculated with geometric precision, as disclosed by U.S. Pat. No. 4,978,983. So, from a plurality of output signals from imaging device 68, a smaller plurality can be determined which correspond to portion 168. Thus, controller 40 can determine and select which output signals correspond to the field of view at film imaging plane 48 and then can actuate display 28 to show an image corresponding to portion 168.

| Parts List |
| --- |
| 10 ... camera |
| 12 ... housing |
| 14 ... objective lens for film imaging |
| 14' ... optical axis of 14 |
| 16 ... objective lens for digital imaging |
| 16' ... optical axis of 16 |
| 18 ... objective lens of viewfinder |
| 18' ... optical axis of 18 |
| 20 ... emitter/receiver for ranging |
| 22 ... image capture button |
| 24 ... flash unit |
| 26 ... rear lens of viewfinder |
| 28 ... LCD image display panel |
| a ... horizontal displacement 14 to 18 |
| b ... horizontal displacement 14 to 16 |
| c ... horizontal displacement 16 to 18 |
| d ... vertical displacement 16 to 18 |
| e ... vertical displacement 14 to 18 |
| f ... vertical displacement 14 to 16 |
| 30 ... zoom optical system of 14 |
| 32 ... movable lens unit |
| 34 ... rear lens unit |
| 36 ... zoom mechanism |
| 38 ... motor |
| 40 ... microcontroller |
| 42 ... film cartridge |
| 44 ... film |
| 46 ... take-up spool |
| 48 ... film imaging plane |
| 50 ... magnetic read/write head |
| 52 ... zoom viewfinder optical system |
| 54 ... movable lens unit |
| 56 ... LCD mask array |
| 56' ... alternative LCD mask array |
| 57 ... control connector from 56 to 40 |

-continued

Parts List

| | |
|---|---|
| 58 | zoom optical system of 16 |
| 60 | movable lens unit |
| 62 | rear lens unit |
| 64 | zoom mechanism |
| 66 | motor |
| 68 | electronic imaging device |
| 70 | user interface including 22 |
| 71 | zoom control button |
| 72 | capture mode selection button |
| 73 | print format selection button |
| 74 | look-up table |
| 76–112 | mask segments of 56 |
| 114 | unmasked center segment of 56 |
| 116–150 | mask segments of 56' |
| 152 | unmasked center segment of 56' |
| 160 | object in a scene |
| 162 | field of view of 58 |
| 164 | field of view of 30 |
| 166 | area array of photosensors |
| 168 | field of view on 68 as seen by 30 from close range |
| 170 | field of view on 68 as seen by 30 from long range |

While our invention has been shown and described with reference to particular embodiments thereof, those skilled in the art will understand that other variations in form detail may be made without departing from the scope and spirit of our invention.

Having thus described our invention in sufficient detail to enable those skilled in the art to make and use it, we claim as new and desire to secure letters patent for:

1. A hybrid camera, comprising:

a camera housing;

an electronic imaging device supported within the camera housing;

a first optical system for focusing light from a scene onto the imaging device, the first optical system having a first optical axis and a first field of view;

a film imaging plane defined within the camera housing for photographic film;

a second optical system for focusing light from a scene onto the film imaging plane, the second optical system having a second optical axis spaced from the first optical axis and a second field of view;

a viewfinder supported by the camera housing, the viewfinder having a third optical axis and a third field of view, the viewfinder being located relative to a selected one of the first and second optical systems such that the third field of view includes at least 75% of the field of view of the selected optical system over typical ranges to an object in a scene;

the field of view of the selected optical system being larger than that of a non-selected one of the first and second optical systems such that the field of view of the selected optical system includes at least 75% of the field of view of the non-selected optical system over typical ranges to an object in a scene;

an array of electronically actuateable masks positioned transverse to the third optical axis within the viewfinder, the masks being configured and located for actuation to correct for parallax between the viewfinder and the non-selected optical system and to indicate a print format for an image to be captured on photographic film;

means for measuring range from the camera to an object in a scene reflecting light to be focused on the imaging device and the imaging plane and for producing a signal proportional to the range; and a controller, responsive to the signal, for actuating selected ones of the masks for correction for parallax, or indication of print format for photographic prints made from images captured at the imaging plane, or both.

2. A hybrid camera according to claim 1, wherein the third field of view includes 75 to 95% of the field of view of the non-selected optical system.

3. A hybrid camera according to claim 1, wherein the third field of view includes 80 to 90% of the field of view of the non-selected optical system.

4. A hybrid camera according to claim 1, wherein the field of view of the selected optical system includes 90 to 110% of the field of view of the non-selected optical system.

5. A hybrid camera according to claim 1, wherein the first and second optical systems and the viewfinder include respective movable lens units to permit zooming to different user-selected magnifications; and the controller determines the selected masks in response to the signal and a user-selected magnification.

6. A hybrid camera according to claim 1, wherein the selected optical system is the first optical system; the second field of view is included within the first field of view; and the imaging device comprises an area array of photosensors which produces a plurality of output signals corresponding to the first field of view, further comprising:

an electronic display, supported by the camera body, for images captured by the imaging device; and wherein the controller receives the plurality of output signals, selects from among the output signals those corresponding to the second field of view, and activates the display to show an image from the second field of view.

7. A hybrid camera according to claim 1, wherein the first and second optical systems are vertically spaced with their axes in a common vertical plane.

8. A hybrid camera according to claim 1, wherein the first and second optical systems are horizontally spaced with their axes in a common horizontal plane.

9. A hybrid camera according to claim 1, wherein the first, second and third optical systems are vertically spaced with their axes in a common vertical plane.

10. A hybrid camera according to claim 1, wherein the first, second and third optical systems are horizontally spaced with their axes in a common horizontal plane.

11. A hybrid camera according to claim 1, wherein the selected optical system is the second optical system, further comprising an electronic display, supported by the camera body, for images captured by the imaging device.

12. A hybrid camera according to claim 1, further comprising a device for selecting image capture mode and producing a further signal, wherein the controller also is responsive the further signal for actuating the selected masks.

* * * * *